(12) United States Patent
Allenspach et al.

(10) Patent No.: US 6,680,808 B2
(45) Date of Patent: Jan. 20, 2004

(54) MAGNETIC MILLIPEDE FOR ULTRA HIGH DENSITY MAGNETIC STORAGE

(75) Inventors: Rolf Allenspach, Adliswil (CH); Gerd K. Binnig, Wollerau (CH); Walter Haeberle, Waedenswil (CH); Peter Vettiger, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 09/798,237

(22) Filed: Mar. 1, 2001

(65) Prior Publication Data

US 2001/0019461 A1 Sep. 6, 2001

(30) Foreign Application Priority Data

Mar. 3, 2000 (EP) .............................. 00810182

(51) Int. Cl.[7] ................................. G11B 5/02
(52) U.S. Cl. ....................... 360/59; 360/84; 360/101; 360/111; 360/126
(58) Field of Search .......................... 369/126, 84, 111, 369/101; 360/59

(56) References Cited

U.S. PATENT DOCUMENTS

| | | | | |
|---|---|---|---|---|
| 4,831,614 A | * | 5/1989 | Duerig et al. | 369/101 |
| 5,835,477 A | * | 11/1998 | Binnig et al. | 369/126 |

FOREIGN PATENT DOCUMENTS

| | | | | |
|---|---|---|---|---|
| DE | 19707052 A1 | * | 8/1998 | G11B/13/04 |
| JP | 04-023293 | | 1/1992 | G11C/11/14 |
| JP | 09-147433 | | 6/1997 | G11B/9/04 |
| JP | 11-250513 | | 9/1999 | G11B/9/00 |

OTHER PUBLICATIONS

Mansuripur M., "The Physical Principles of Magneto-Optical Recording", 1998, The Pres Syndicate of the University of Cambridge, First Paperback Edition, pp. 463–464 and 575.*

IBM Technical Disclosure Bulletin, "Electroplated Cobalt Alloys as Perpendicular Media for Magnetic Storage", Feb. 1, 1990. vol. 32, Issue No. 9B, pp. 416–418.*

Binnig et al., "Ultrahigh–density Atomic Force Microscopy Data Storage with Erase Capability", Mar. 1, 1999. Applied Physics Letters, vol. 74, No. 9, pp. 1339–1331.*

* cited by examiner

Primary Examiner—David Hudspeth
Assistant Examiner—Natalia Figueroa
(74) Attorney, Agent, or Firm—Lewis L. Nunnelley; William D. Gill

(57) ABSTRACT

The present invention relates to computer storage systems which have a tip (24) directed close or in contact to the storage medium (10) by which bit-writing and bit-reading is enforced. It is proposed to use a magnetizable storage medium (10), expose it to an artificial, external magnetic field H coupled externally to the storage medium, and—during bit writing—to concurrently apply heat very locally in bit size dimension in order to let the external magnetic field become locally larger than the (temperature-dependent) coercive field at the location (32) where heat is applied. Further, a two-dimensional array of cantilever tips (24) is advantageously used in an inventional storage system each of which tips serves as a heat source when it is activated by a current flowing through a resistive path within said tip (24) and producing the necessary temperature at the small storage medium location (32) where the bit writing is intended in order to approach the Curie temperature or the compensation temperature of the magnetic material.

10 Claims, 2 Drawing Sheets

MAGNETIC MILLIPEDE FOR ULTRA HIGH DENSITY MAGNETIC STORAGE

FIELD OF THE INVENTION

The present invention relates to computer storage systems. In particular it relates to storage systems which have a tip directed close or in contact to the storage medium by which bit-writing and bit-reading is enforced.

BACKGROUND OF THE INVENTION

It is a general aim for the computer industry to increase the storage density of the storage systems being used by computers. Every new technology, however, which is a good candidate to replace today's storage methods should offer long-term perspectives in order to give room for continued improvements within this new technology over a couple of years because with a fundamental change of storage technology the computer industry would have to undertake remarkable investments in order to adapt existing production machines or to replace existing machines by new ones for any technical purpose involved with said new technology.

Thus, the consequence for further development of storage systems is that any new technique with better storage area density should have a long-term potential for further scaling, desirably down to the nanometer or even atomic scale.

The only available tool known today that is simple and yet provides these very long term perspectives is a nanometer sharp tip. Such tips are used in every atomic force microscope (AFM) and scanning tunneling microscope (STM) for imaging and structuring down to the atomic scale. The simple tip is a very reliable tool that concentrates on one functionality: the ultimate local confinement of interaction.

In recent years, AFM thermomechanical recording in polymer storage media has undergone extensive modifications mainly with respect to the integration of sensors and heaters designed to enhance simplicity and to increase data rate and storage density. Using heater cantilevers, thermomechanical recording at 400 Gb/in$^2$ storage density and data rates of a few Mb/s for reading and 100 kb/s for writing have been demonstrated as it is described in G. Binnig, M. Despont, U. Drechsler, W. Haeberle, M. Lutwyche, P. Vettiger, H. J. Mamin, B. W. Chui, and T. W. Kenny, "Ultrahigh-density atomic force microscopy data storage with erase capability", Applied Physics Letter, Volume 74, Number 9, Mar. 1, 1999, pp 1329–1331.

Such prior art thermomechanical writing is a combination of applying a local force by the cantilever/tip to the polymer layer and softening it by local heating. By applying sufficient heat an indentation can be formed into the storage medium for writing a bit which can be read back with the same tip, by the fact that the lever is bent when it is moved into the indentation and the electrical resistance of a sensing circuit is changed therewith.

While writing data or bits, the heat transfer from the tip to the polymer through the small contact area is initially very poor and improves as the contact area increases. This means the tip must be heated to a relatively high temperature, about 400° C., to initiate the melting process. Once melting has commenced, the tip is pressed into the polymer, which increases the heat transfer to the polymer, increases the volume of melted polymer, and hence increases the bit size. After melting has started and the contact area has increased, the heating power available for generating the indentations increases by at least ten times to become 2% or more of the total heating power. With this highly nonlinear heat-transfer mechanism it is very difficult to achieve small tip penetration and hence small bit sizes as well as to control and reproduce the thermomechanical writing process.

A further problem in this polymer/tip approach is that each bit-writing process effectuates a structural change in the storage medium, i.e. the above mentioned indentation, which is subjected to mechanical wear on the one hand and which is the cause for mechanical wear of the sensing tip on the other hand. Thus, a large number of subsequent reading processes reduces the bit quality.

A further disadvantage in said approach is that single bits can not be erased. Instead, they can only be erased in blocks of about 10 Mbit.

During the practical utilization of a storage medium, however, a byte-selective erase process is often preferred.

Both of the last mentioned problems, i.e., mechanical wear and insufficient local resolution during bit-erasing are caused by the same feature, i.e. the fact, that the bit-writing process is coupled to a structural change in the medium which appears at the medium surface.

A different approach to write into and read from a storage medium without any change of the medium's surface is the magneto-optical approach as it is disclosed for example in DE 197 07 052. A laser beam is used for heating up the storage medium locally, and bits are written in the heated region preferably, when the coercive field of the storage area is low. This approach, however, is limited in area resolution as the laser spot transferring the heat into the storage medium has at least the size of half of the laser wave length, or can be reduced further only marginally by superposition of e.g., the kernels of two laser spots having each a reduced power. Thus, with said approach bit-sizes of about 200–400 $\mu$m can be achieved. Those huge bit-sizes, however lead to storage densities which are not able to be tolerated within the ambitious aim of increasing storage densities up to values of several 100 Gb/in$^2$.

SUMMARY OF THE INVENTION

It is an objective of the present invention to provide a storage system which does not suffer from mechanical wear and which allows for storage densities of several 100 Gb/in$^2$.

In order to write bits or data in digital form into the storage medium the basic concepts of the present invention comprise using a magnetizable storage medium, expose it to a magnetic field coupled externally to the storage medium, and during writing to concurrently apply heat locally in bit size dimension in order to let the external magnetic field become locally larger than the coercive field at the location where heat is applied.

According to the present invention this is achieved by providing a storage system comprising a magnetizable storage medium, a source of an external magnetic field, and at least one write head, but preferably an array of write heads. Each write head has a small dimensioned tip with a resistive path or a resistive loop such that when driving a current through it heat is exerted onto the location where the bit or data storage is intended to be performed.

It should be noted that the inventional concept includes using a magnetic coil, or any other magnetic source, even a permanent magnetic layer to provide the external magnetic field.

Data or bit writing is provided by heating the storage medium locally when the current flows through the resistive path and the local temperature approaches or reaches the Curie temperature of the storage medium, or the compensation temperature, whereby the source of said magnetic field produces a magnetic field which is higher than the coercive field at a given temperature. Thus, a bit can be written into the storage medium.

In particular and according to a preferred embodiment of the inventional storage system, it is proposed to provide a one- or two-dimensional array of cantilever tips each of which serves as a heat source when activated by a current flowing through a resistive path within said tip. This produces the necessary temperature at the small storage medium location where the bit writing is intended to approach the Curie temperature or the compensation temperature of the magnetic material.

Basically, bits can be generated with or without direct contact between tip and storage medium. If there is no contact, which might be a significant advantage compared to thermo-mechanical bit writing, a soft medium can advantageously be taken as a heat guide between tip and storage medium. If there is a contact then a lubricant may be used for wear reduction and for increasing the heat transfer.

The storage medium is proposed to be formed as a thin plate the surfaces of which are covered with some protection layer.

During bit writing when the Curie, or the compensation temperature, is reached a coil arranged in parallel below or above the storage medium produces a magnetic field effective to larger portions of the medium, including in particular the same medium location heated by the tip heat. The area covered by the magnetic field should be larger than the intended bit size in order to assure a sufficient magnetic effect. The magnetic field is higher than the coercive field and thus, a bit is written with a magnetization along the direction of this external field. In this way, stable bits can be written.

Preferred materials for bit writing with the described concept are materials with a large perpendicular magnetic anisotropy. The perpendicular magnetic anisotropy has to be larger than shape anisotropy in order to stabilize the magnetization along the direction perpendicular to the surface plane. Materials fulfilling this criterion are rare earth transition metal alloys such as TbFe, GdCo, DyFe, or mixtures, i.e., compositions thereof. These materials are typically ferrimagnets with sublattices of oppositely oriented magnetization which do not exactly compensate at ambient temperature. The exact amount of e.g. Tb vs. Fe is chosen such that either the temperature where the sublattice magnetizations compensate, i.e., the compensation temperature, is at a temperature best suited for the writing process, or such that the temperature at which the materials loose their ferromagnetism, i.e., the Curie temperature, is not too far above the writing temperature.

Typical materials also include ternary compounds (e.g. TbFeCo) or even quaternary or higher (e.g. GdTbDyFeCo) in variable composition. Most of these materials have the largest perpendicular anisotropy in an amorphous state. Another material class are the garnets, which all contain oxygen as a nonmetal element. Examples are $Y3Fe5O12$, or $BaFe12O19$.

In all these materials the rare earth element is the most relevant for the large perpendicular anisotropy. A completely different class exploits a property of many ultrathin magnetic films. Ultrathin films often have a perpendicular surface anisotropy which stabilizes the perpendicular magnetization, even when they do not contain rare earths. Examples are Co films grown on Au(111), Pt(111), Pd(111), or Fe films grown on Cu(001). Depending on the exact film thickness (typically 1 to 5 atomic layers, i.e. <1 nm) the anisotropy and other magnetic properties can by tailored to have optimum material properties for the proposed writing process.

Multilayers of these materials (such as Co/Pt/Co/Pt/Co/Pt . . . ) can stabilize the materials and make them more robust against external influences such as corrosion, etc. Alloys of CoPt with varying composition are a variant of the concept of using optimized magnetic properties existing at surfaces in bulk materials.

Depending on the selected material, the thickness of the magnetizable layer can be adapted to the respective aimed and focused properties of the storage medium.

According to a further preferred aspect of the present invention the before mentioned approach can be combined with the 'Millipede' technique which is disclosed in U.S. Pat. No. 5,835,477, titled 'Mass-storage Applications of Local Probe Arrays', issued Nov. 10, 1998. For more detailed information on structure and functionality, as well as on fabrication know-how of the basic elements of the millipede arrangement it should be referred thereto.

Said millipede is a two-dimensional arrangement of such cantilever tips, i.e. a local probe array, and the storage medium comprises array fields which correspond in distance to the distances between said millipede tips. A read or a write process comprising more than the millipede area is achieved by moving the millipede in parallel to the medium surface in a x- or y-direction in order to find a new position having a starting point for the whole array. This feature is referred to herein as global tracking feature for the whole array.

The approach of writing a bit with a millipede arrangement has the advantage that no pre-patterning of the media is necessary and that therefore the problems with respect to positioning the cantilever array at predefined locations can be circumvented because the array is self-aligned as the location of the bits during read back is determined by the position of the tips during writing. Thus, the small spatial tolerances required to read back the intended bit can easily be achieved compared to a case where pre-patterning is performed and only a fraction of the two-dimensional bit array can be retrieved successfully.

A further advantage according to the present invention is that storage materials can be used which are not limited to presently employed magneto-optic media because the issue of a large magneto-optic response at a certain read out wave length does not exist. Thus, materials can be used with optimized magnetic and structural properties such as high magnetization and resistance to corrosion, e.g. Co/Pt multilayers or alloys, as was already mentioned above.

It should be stressed that according to the present invention bit sizes of about 20 nanometer and smaller can be realized whereas the only comparable prior art method for magnetically writing bits is the magneto-optical method where a bit size of about 200–300 nanometer can be realized only. Thus, the inventional concept combines the reliability of magnetic bit writing with the advantages achieved from using a tip for localizing the bit area.

BRIEF DESCRIPTION OF THE DRAWINGS

The present invention is illustrated by way of example and is not limited by the shape of the figures of the accompanying drawings in which.

DESCRIPTION OF THE PREFERRED EMBODIMENT

With general reference to the figures and with special reference now to FIG. 1 a preferred embodiment of the inventional storage chip system comprising a two-dimensional (array) millipede arrangement for writing bits in a direct-contact between tip and storage medium will be described next below.

A variation of this is a non-contact mode which is mentioned later on.

Technical details referring to array design, technology and fabrication may be taken from the above cited U.S. Pat. No. 5,835,477.

Figure 1:
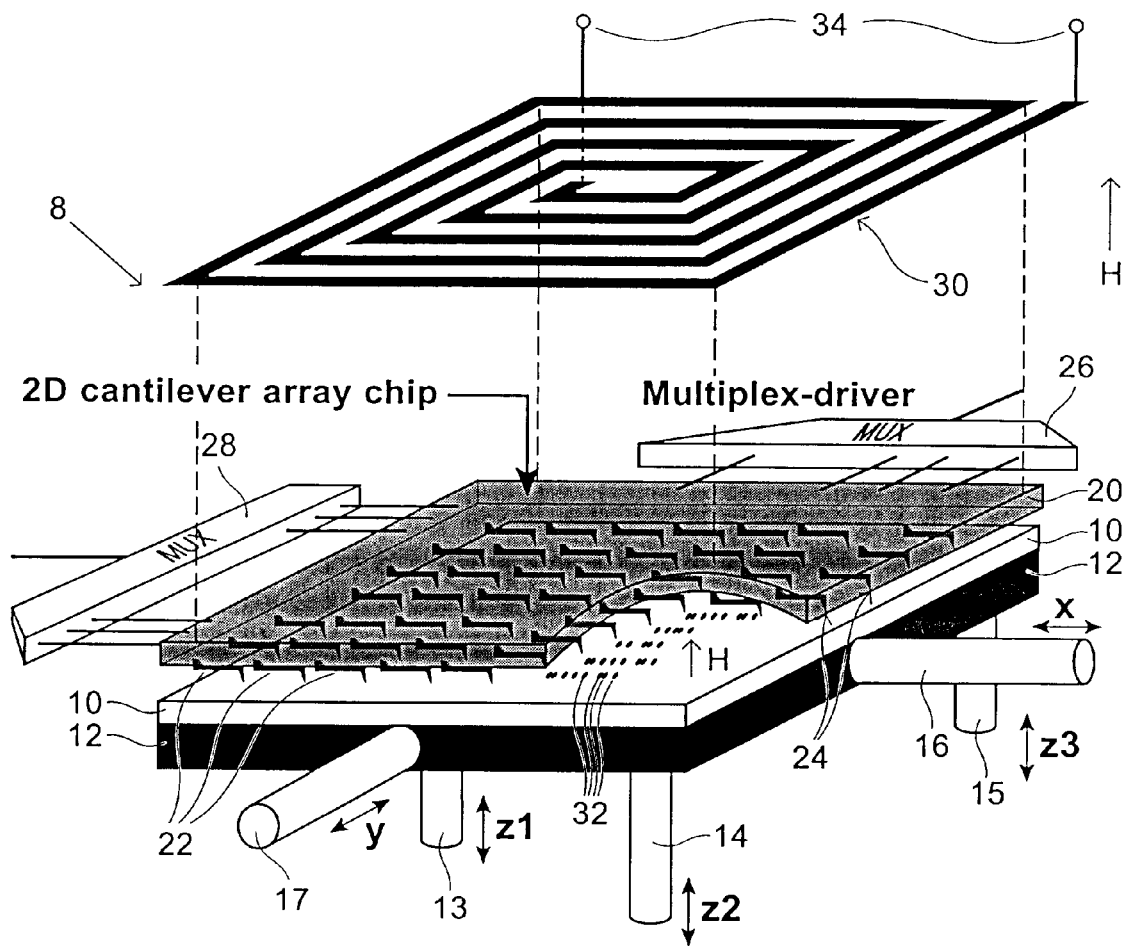
FIG. 1 is a partly exploded view showing the basic construction elements of a preferred embodiment of the inventional storage chip system.

The inventional chip 8 depicted in FIG. 1 comprises a magnetizable storage medium 10 of one of the above mentioned preferred materials forming a layer 10 which is supported on a supporting layer 12. The storage layer 10 is protected with a thin protection layer which is not depicted explicitly in the drawing in order to improve its clarity. The layers 10 and 12 are able to be moved in X-, Y- and Z-direction. The Z-directional moving is depicted to be realized with the help of three setting means 13, 14, 15, whereas the motion in X- and Y-direction, respectively, is accomplished with only one setting means 16, 17, respectively.

A probe layer 20 on the chip 8 acts as a heater platform and comprises a two-dimensional local probe array with a plurality of cantilevers 22 comprising each a local probe which are arranged in rows, and columns, respectively. Only some of the local probes are depicted with reference sign 22. In the example depicted in FIG. 1 the actual local probe is the tip 24 of each of the cantilevers 22. According to the present invention the surface of the layer 20 was micromachined in order to form said cantilevers at the wafer surface. Further, silicon was used to form the cantilevers in order to achieve an appropriate thermal expansion coefficient. It should be noted that an individual cantilever motion relative to the heater platform is not required because the heater platform is leveled and approached to the storage medium as a whole.

Advantageously, the cantilever mass should be minimized in order to obtain soft, high-resonant-frequency cantilevers. Soft cantilevers are required for a low loading force during a direct contact between tip 24 and medium 10 to be heated. A high resonant frequency allows for high-speed scanning. In addition, sufficiently wide cantilever legs are required for a small thermal time constants which is partly achievable by cooling via the cantilever legs. The above design considerations lead to cantilevers with 50 micrometer long, 10 micrometers wide, and 0.5 micrometer thick legs, and a 5 micrometer wide, 10 micrometer long and 0.5 micrometer thick platform. Such a cantilever has a stiffness of 1 N/m and a resonant frequency of 200 kHz. The heater time constant is a few microseconds, which allows a multiplexing rate of 100 kHz. Further, the tip height should be as small as possible because the heater platform sensitivity depends strongly on the platform-medium distance.

In order to be able to operate as a heat source the cantilevers 22 including the tips 24 comprise each a resistive path, which is controlled and driven by the multiplex arrangement depicted with reference signs 26, 28. Thus, like in prior art, the multiplex driver 26, 28 can be used for driving a current through one or more of the cantilevers 22 and associated tips 24. The cantilever and tip material is chosen such that the tip heats up with this driving current until a temperature is reached which approaches the Curie temperature or the compensation temperature of the storage medium.

A magnetic coil 30 is depicted above the probe layer 20. It should be noted that the drawing depicts a partly exploded view of the storage system. Thus, the coil is depicted elevated far above the probe layer 20. In reality, however, the magnetic coil 30 is arranged close to the probe layer and can be fixed to the probe layer 20. Of course, the coil 30 can be embedded in a further coil protection layer which, however, is not explicitly depicted in the drawing.

When a DC current flows through the coil 30 driven via the connection terminals 34 an associated magnetic field H perpendicular to the coil plane is generated as depicted in the drawing.

When the storage chip depicted in FIG. 1 is in operation the distance between magnetic coil and storage medium is set such that the magnetic field H is higher then the coercive field of the storage medium at the bit-writing temperature which in turn is reached when a tip 24 is heated and brought into contact with the storage medium.

When after bit writing the temperature of the storage location goes down again the bit location has a magnetization in parallel to the external magnetic field H, as it is depicted in the drawing. The small structures denoted with reference sign 32 symbolically represent the bits which can be written.

It should be noted, that the duration of heating each of the tips 24, as well as the respective tip-related heating current should be dimensioned such that the heat has enough time to flow from the tip into the storage medium. In the example depicted in FIG. 1 there is no intermediate layer between tip and storage medium. As mentioned further above, however, a low wear layer may be provided against mechanical wear of the storage medium itself.

Figure 2:
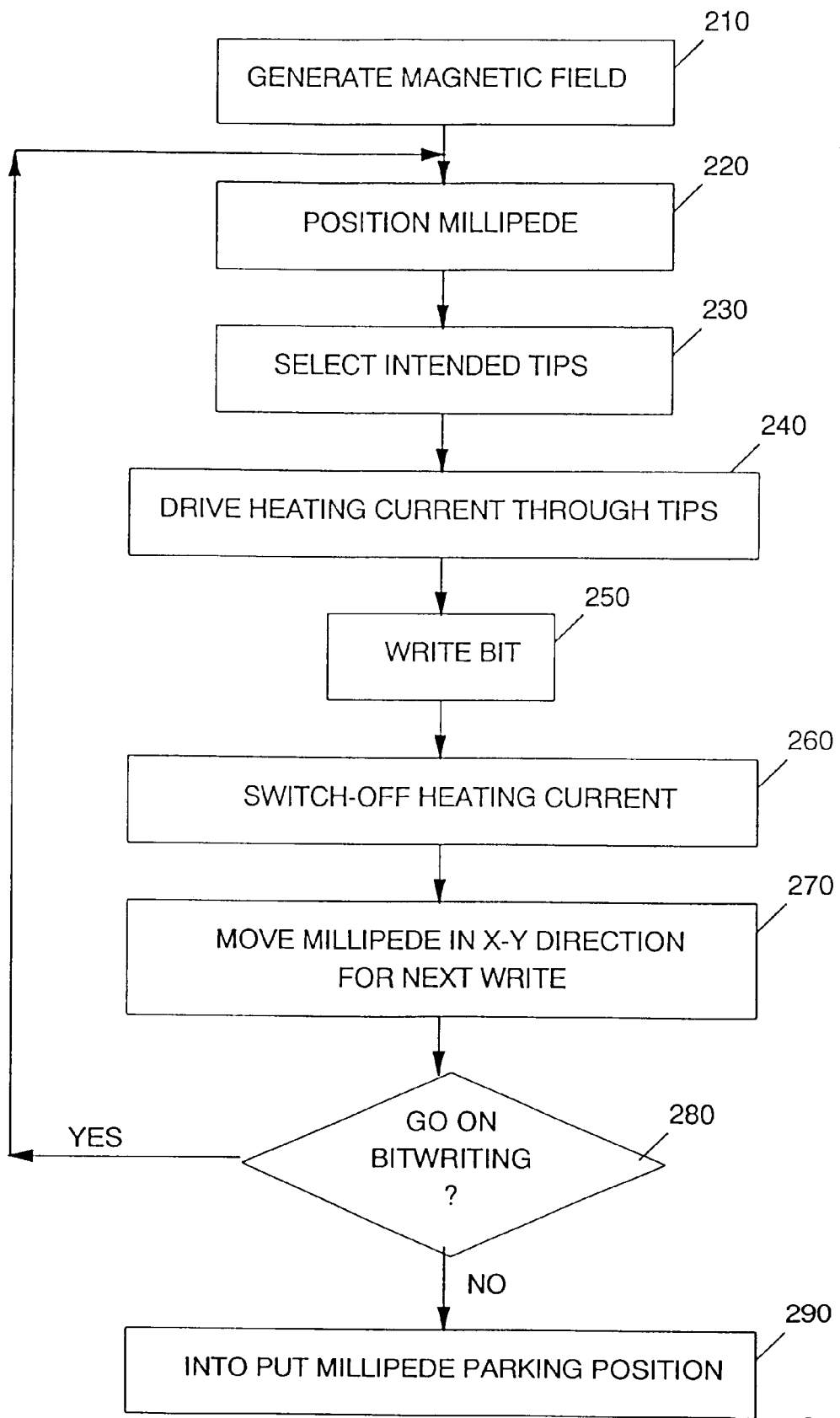
FIG. 2 is a schematic diagram showing the most essential steps of the inventional bit writing method.

With reference now to FIG. 2 the most essential steps during the inventional bit-writing method is described in more detail. First, in a step 210, the magnetic field H is generated by driving a current through the magnetic coil 30 via the connection terminals 34. The coil current is dimensioned large enough in order to establish a magnetic field which is adapted to be higher than the coercive field at the intended bit-locations.

Then, in a step 220, the millipede arrangement comprising the probe layer 20 including the multiplex terminals 26, 28, as well as the magnetic coil 30 are positioned in order to read from the intended portion of the chip-area. This step is basically dependent of the actual dimension of probe layer 20 relative to the dimension of the storage layer 10.

When the coil and the heating platform are large enough to cover the whole chip area, no x-y movement is required at all. Then, the step of positioning the millipede heating platform 20 essentially consists in approaching it in contact to the storage medium 10.

When the heating platform area, however, is only a fraction of the total chip storage area, for example, when the storage layer 10 comprises a plurality of sub-portions having the same size as the platform 20, the millipede arrangement must be moved possibly in X-, Y-direction along a considerable distance. In order to do that, the millipede arrangement is first moved up in order to keep some distance to the storage layer 10 during said long distance movement between sub-portions. When the proper sub-portion is found the millipede arrangement is lowered, i.e. is approached to the storage layer 10, again. In order to be ready for bit writing the lowering motion is performed until a direct contact or near contact between tips and storage medium has been realized. In any variation, the millipede arrangement is thus properly positioned. Then, or earlier, in a step 230 the desired cantilever tips are selected via the multiplex driver 26 and the multiplex-terminal 28.

In a step 240, a heating current is driven as described above through the resistive paths of the selected tips 24 in order to heat the tips and transfer the tip-heat into the desired storage location immediately below the tip. When the current is properly dimensioned and the heating duration is long enough the storage location of the storage medium is heated in the desired way.

Then, by combined action of the magnetic field H and locally applied heat a bit is written, step 250, by magnetizing the storage location in parallel to the external magnetic field H. In the direct environment of the freshly written bit the storage medium temperature is not high enough to lower the coercive field such that it is smaller than the external magnetic field H because the environment of the storage location has permanently a temperature which is significantly below the compensation or the Curie-temperature, respectively.

When, after switching off the heating current, step 260, the heating is terminated the millipede arrangement is moved up again into the before-mentioned larger distance to the storage medium. Then, the temperature at the freshly written bit location falls down again to the regular operation temperature of the device. When becoming colder the bit location keeps the magnetization caused by the external magnetic field H limited to its small storage medium area. Thus, a stable bit has been written.

The above described way of writing has the advantage that no patterning of the media is necessary, and therefore the problems with respect to positioning the cantilever array at a predefined location is circumvented: the array is self-aligned because the location of the bits is determined by the position of the tips during writing.

Then, in a step 270 the millipede arrangement can be moved along the X-, Y-direction in order to be re-positioned again for writing some new bits.

Then, if further bits shall be written, decision 280, it is branched back to step 220, else, the millipede arrangement is put into a parking position, step 290.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense. As can be seen from the flow diagram depicted in FIG. 2, the magnetic field may also be permanently active during repeated bit-writing processes. Thus, in an alternative embodiment of the present invention the magnetic coil may be replaced by a magnetic layer comprising any appropriate permanent magnetic material.

Basically, the inventional storage system can be realized e.g., as a hard disk drive comprising one or more one dimensional or two dimensional cantilever array(s) according to or similar to the above described way and suspended in the hard disk frame according to prior art technique. The term 'array' is to be understood to describe any advantageously regular arrangement of write head supporting cantilevers. Thus, a plurality of parallel one dimensional 'rows' of them arranged close to each other can be regarded as a two-dimensional array.

When further varying the inventional storage system many parameters can obviously be varied in size while keeping the basic functionality described above. Examples are the distance between tips and storage medium, the tip temperature during the bit-writing phase, the intensity of the external magnetic field H, the distance between magnetic coil 30 and storage layer 10, or the materials which may be used as lubricants with respect to their heat-conduction coefficient.

As it is appropriate the before-mentioned parameters may be combined in order to provide a storage system having any further desired features. Even the size of the storage medium may be varied broadly. It can be a plate having a rectangular form and having an array of sub-portions on it as it was already mentioned above where each of the subportions match the size of the millipede arrangement. There can further be any overlap area between sub-portions, too. Further, the inventional storage system may also be constructed as a rotating system. Then, an embodiment is preferred in which the storage layer is a rotating disc and one or more millipede arrangements are provided covering the inner storage area of the associated peripheral circle of the disc.

Further, the constructive element generating the magnetic field, i.e. a coil, or a permanent magnet can also be put at the opposite side of the storage layer, i.e. opposite to the top-position depicted in FIG. 1.

The inventional concepts may be extended to include a read facility, too. For this, prior art technology like magnetic force microscopy (MFM), i.e. a read process with a magnetic tip or, alternatively, read technology using magnetoresistive elements could be used. In a magnetoresistive element, the change in electrical resistance is detected depending on the direction of the magnetic stray field of the bit to be read.

We claim:

1. A storage system, comprising:
   a write head having a tip connected to a resistive path locally exerting heat when driving a current through it;
   a magnetizable storage medium to receive written data from said write head, wherein the storage medium is heated locally when said current flows through said path and the
   local medium temperature approaches the Curie temperature or the compensation temperature; and,
   a source of a magnetic field, said source being able to produce a magnetic field which is higher than the coercive field at the temperature reached such that data is written on the storage medium.

2. A storage system according to claim 1 wherein the material used for said storage medium has a magnetic anisotropy perpendicular to the plane of said storage medium which is larger than the shape anisotropy.

3. A storage system according to claim 2 in which the material used for said storage medium comprises:
   rare earth-transition metal alloys, or ternary, quaternary or higher compositions thereof, or garnets.

4. A storage system according to claim 1 wherein a plurality of write heads are arranged in the form of at least one array and said magnetizable storage medium having storage areas matching the form of the one or more write head arrays.

5. A storage system according to claim 1 in which said storage medium is arranged to be rotated and the source of the magnetic field and the write head array being fixed and have a form adapted to circular geometry.

6. A storage system according to claim 1 in which an intermediate layer is provided between said tip and said storage medium.

7. A method for writing data into a storage medium, comprising:

arranging one or more heat emitting tips each connected to a resistive path near respective locations of a magnetizable storage medium;

driving a current through said resistive paths heating said number of tips wherein said storage medium locations are heated at least to a predetermined minimum data writing temperature;

applying a magnetic field to said medium storage locations while said medium storage locations are being heated wherein said field is higher than the coercive field at said data writing temperature such that data are written at said one or more locations.

8. A method according to claim 7 wherein at least some of the tips are in direct contact with the storage medium.

9. A method according to claim 7 wherein an intermediate layer is provided between said tips and said storage medium.

10. A method according to claim 9 wherein said intermediate layer comprises a low wear layer.

* * * * *